United States Patent

[11] 3,627,032

[72] Inventors Philip S. Glad
  Decatur;
  Frank D. Parker, Sr., Atlanta; Richard W. Glad, Atlanta, all of Ga.
[21] Appl. No. 45,621
[22] Filed June 12, 1970
[45] Patented Dec. 14, 1971
[73] Assignee Parker Engineered Chemicals, Inc.
  Atlanta, Ga.

[54] COOLING TOWER WATER TREATMENT SYSTEM
  9 Claims, 2 Drawing Figs.
[52] U.S. Cl. .................................... 165/32,
  165/95, 165/107
[51] Int. Cl. ................................... G05d 23/00
[50] Field of Search ........................... 165/95, 60,
  32, 107, 12; 261/DIG. 3, DIG. 31

[56] References Cited
UNITED STATES PATENTS
2,859,766  11/1958  Shuldener .............. 261/DIG. 31
3,282,277  11/1966  Hayman ................ 261/DIG. 3
3,450,265  6/1969   Kreusch et al. ........ 261/DIG. 3

Primary Examiner—Charles Sukalo
Attorney—Jones & Thomas

ABSTRACT: A water treatment system for a large capacity air conditioner or similar heat exchange system which includes a reservoir, a refrigeration unit, a cooling tower for spraying the water to the reservoir, and flow means for flowing water from the reservoir through the refrigeration unit to the cooling tower. Water makeup means is provided for adding additional fresh water to the reservoir, and a water drain system functions to drain away the stale water of the reservoir in response to the inflow of fresh makeup water. Chemical additive pumps function to add chemical compositions to the circulating water as makeup water is added to the system.

INVENTORS
FRANK D. PARKER, SR.
RICHARD W. GLAD
PHILIP S. GLAD
BY
*Jones & Thomas*
ATTORNEYS

COOLING TOWER WATER TREATMENT SYSTEM

BACKGROUND OF THE INVENTION

In the water circulation system for a large capacity air-conditioning unit, the hot water flowing from the heat exchanger of the air conditioning unit is usually directed to the upper end of a cooling tower where it is sprayed in the air down through a relatively open tower for cooling purposes. When the water reaches the reservoir at the lower end of the tower, it is available for recirculation through the system.

Water normally contains minerals and when the water is evaporated from the flow system as it flows down through the cooling tower the minerals are generally left behind and tend to accumulate in the liquid remaining in the reservoir, and the spraying of the water causes the water to become substantially saturated with oxygen. The minerals eventually drop out of solution from the saturated water and form scale on the surfaces of the cooling tower and in the conduits of the heat exchanger and other flow conduits of the system. The scale forms an insulating barrier and inhibits the transfer of heat at the heat exchanger and narrows the flow passage ways of the flow conduits. The oxygen of the water tends to react with the metal surfaces of the structure and to corrode and to otherwise deteriorate the structure. Moreover, the warm water of the system forms a breeding place for algae, bacteria, fungae, etc., which tends to block the flow system of the apparatus.

Because of these general problems, it has become customary to inject chemical compositions in the cooling tower water. These chemical compositions include scale and corrosion inhibitors and occasionally an algaecide. In the past the automated devices utilized to add these chemicals to the flow systems usually included a pump for pumping small quantities of liquid compositions into the cooling tower water as the tower pump operated to flow water from the reservoir through the heat exchanger and to the spray at the top of the cooling tower. The chemical pump thus ran continuously with the tower pump, without regard to the condition of the water in the cooling tower. Moreover, the algaecides were usually added by hand in large quantities by a maintenance man, since algaecides do not seem to work effectively when added continuously to such a system. In addition, the devices utilized a water bleed system to bleed the stale water from the cooling tower so that the stale water saturated with large quantities of minerals and chemicals could be progressively replaced with fresh water. The devices utilized to perform the water bleed function have usually been embodied in a bleed conduit that is opened by a valve in response to the operation of the cooling tower pump. Thus, the bleed of the stale water was slow and continuous and routed through a relatively small valve opening which was easily blocked by debris in the water, etc., and rendered inoperative.

In order that the addition of chemicals to the water of a cooling tower could be more responsive to the condition of the water, some devices have been developed for testing the electrical conductivity of the water and actuating a chemical pump in response to a certain level of water conductivity. These systems function properly only on a temporary basis since the device for continuously testing the conductivity of the water becomes coated with scale and becomes ineffective and inaccurate. The chemical additive system therefore becomes unreliable and requires continual maintenance.

SUMMARY OF THE INVENTION

Briefly described, the present invention comprises a water treatment system for the water circulation system of a large capacity air-conditioning system which functions to maintain the water in the system in a suitable condition for passage through the heat exchanger and into engagement with the surfaces of the flow system. Makeup water is added to the reservoir of the cooling tower to replace the water lost from evaporation and windage, and chemicals are added to the water in the flow system as the water flows from the heat exchanger to the spray means at the top of the cooling tower. The chemicals are added only during the operation of the cooling tower pump and as the makeup water enters the reservoir. Thus, when the water level in the reservoir is low, which is when the concentration of minerals and oxygen is relatively high, fresh water and chemicals are added to the system to reduce the concentration of minerals in the water and their deleterious effects. If the atmospheric conditions change so that the frequency of water replenishment is reduced, the minerals left behind in the water due to evaporation of the water will be reduced and the necessity of adding chemicals to the water will be reduced. Thus, the system functions to add chemicals to the water in response to the flow of makeup water to the system, which normally corresponds to the concentration of minerals in the water.

Thus, it is an object of this invention to provide a water treatment system for a water-cooled air-conditioning system which prolongs the life of the components of the system and reduces the frequency of inspection, maintenance and repair of the system.

Another object of this invention is to provide a cooling system that controls the composition of its cooling water to reduce the formation of scale, oxides, algae, bacteria, etc., on the surfaces of the system and in the water of the system.

Other objects, features and advantages of the present invention will become apparent upon reading the following specification when taken into conjunction with the accompanying drawing.

DESCRIPTION OF THE PREFERRED EMBODIMENTS

Figure 1:
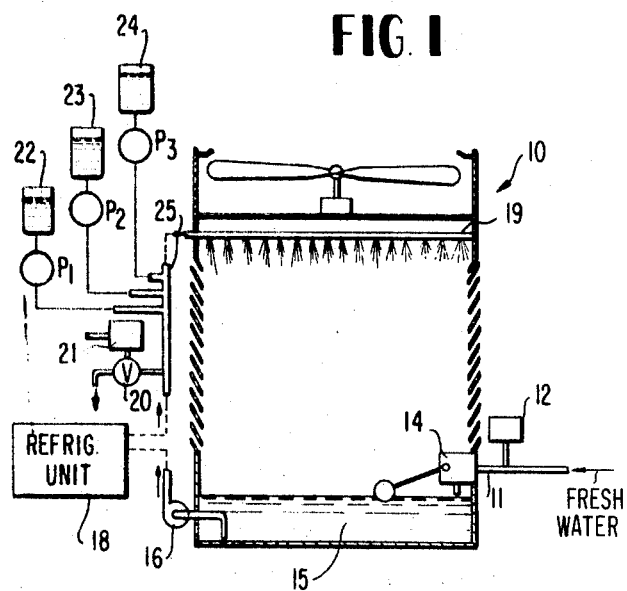
FIG. 1 is a schematic elevational view of a cooling tower and cooling system of a large capacity air-conditioning system.

Referring now in more detail to the drawing, in which like numerals indicate like parts throughout the several views, FIG. 1 illustrates water cooling tower 10, fresh water inlet conduit 11, flow switch 12, and float-controlled valve 14 which controls the inlet of the water to the reservoir or sump 15 of the cooling tower. Cooling tower recirculating pump 16 functions to flow the water from sump 15 through the heat exchanger (not shown) of refrigeration unit 18 and to the spray conduit 19 in the upper portion of the cooling tower 10. The water treating means includes bleed valve 20 controlled by solenoid 21, and diaphragm injection pumps P1, P2 and P3 arranged to inject chemicals from supply sources 22, 23 and 24, respectively, into recirculating conduit 25 downstream from recirculating pump 16 and refrigeration unit 18. Bleed valve 20 is positioned downstream from refrigeration unit 18 so that the hottest water of the system is discharged, and pumps P1, P2 and P3 are positioned downstream from bleed valve 20 so that the chemicals from these pumps will not be lost through the bleed valve and will be injected into the hottest water of the system where it is most effective.

Figure 2:
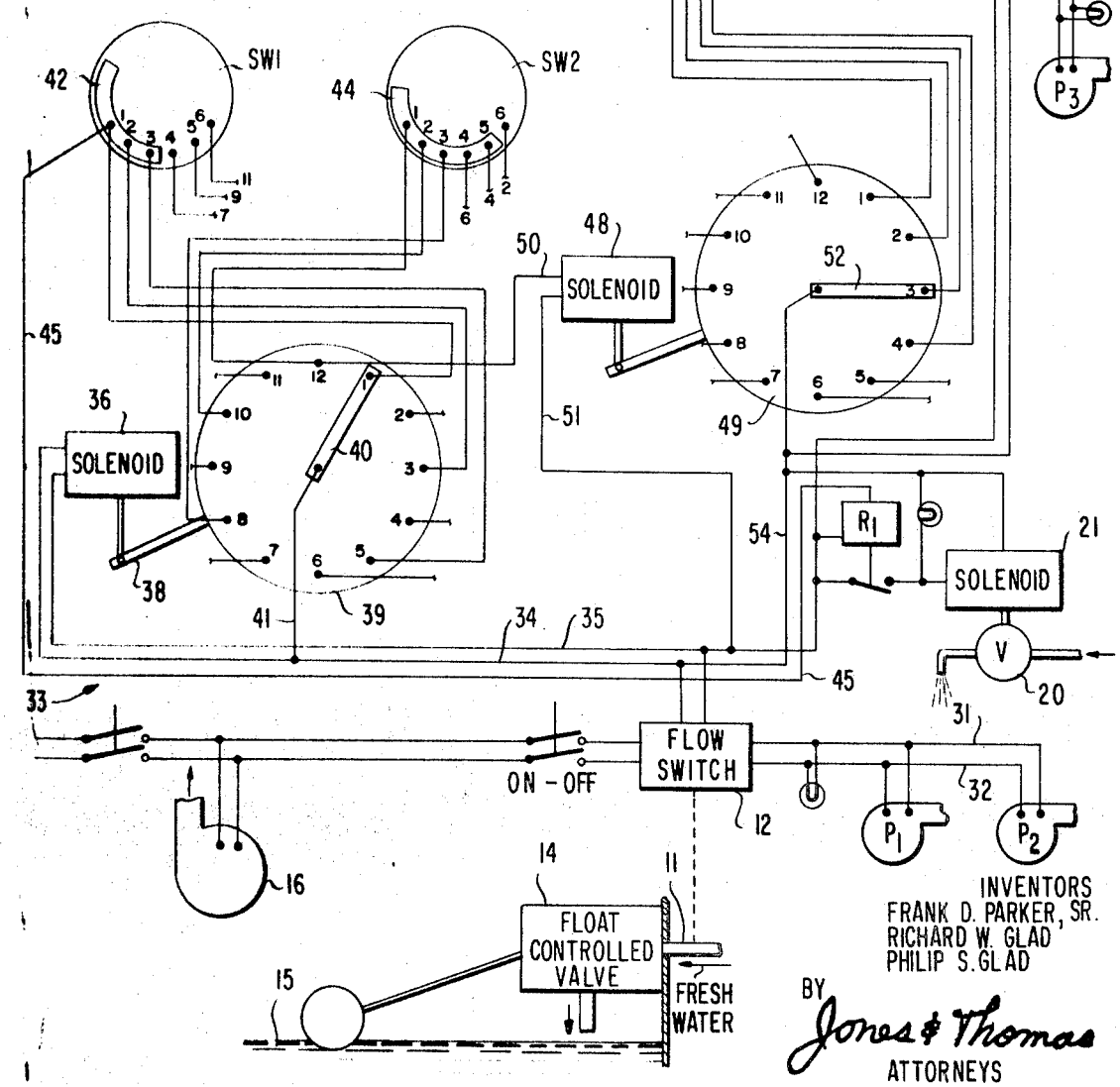
FIG. 2 is an electrical schematic of the control system for the cooling system of FIG. 1.

As is illustrated in FIG. 2, when pump 16 is operating and float controlled valve 14 opens to flow fresh water through conduit 11 to sump 15, flow switch 12 will detect the flow of water and will function to energize the system. When flow switch 12 is closed due to the flow of fresh water through conduit 11, pumps P1 and P2 are energized through conductors 31 and 32, and the water treating means or variable control mechanism 33 is energized through terminal conductors 34 and 35. Solenoid 36 is immediately energized and functions to move the lever 38 of stepping switch 39; however, the rotatable conductor arm 40 of stepping switch 39 will move only when solenoid 36 has been deenergized. Movable arm 40 of stepping switch 39 is connected through conductor 41 to conductor 34. The odd-numbered contacts of the 12 contacts on stepping switch 39 are connected to the six contacts on selector switch SW1. The crescent conductor 42 of selector switch SW1 is arranged to progressively cover the contacts of the selector switch. The even-numbered contacts of stepping switch 39 are connected to the contacts of selector switch SW2, and its crescent conductor 44 is also arranged to make progressive contact of its contacts. With this arrangement, as rotatable arm 40 of stepping switch 39 rotates and sequentially engages its contacts, it will be alternately connected to selector switches SW1 and SW2.

When rotatable arm 40 of stepping switch 39 engages any one of its odd-numbered contacts, and if the crescent conductor 42 of selector switch SW1 is moved so that it engages all of its contacts, conductor 45 connected to contact numbered 1 of selector switch SW1 will be connected to the rotating conductor arm 40 on alternate positions of the conductor arm, which energizes relay R1 and makes a circuit to solenoid 21 to open bleeder valve 20. Thus, the sump 15 will be bled by bleeder valve 20 on alternate operations of float controlled valve 14. Of course, if the crescent conductor 42 of selector switch SW1 is repositioned so as to cover less than all of its contacts, the operation of bleeder valve 20 will be less frequent. For example, if crescent conductor 42 of selector switch SW1 is positioned as shown so as to cover the first three of its six contacts, bleeder valve 20 will function to operate on the first, third and sixth operation of float-controlled valve 14, and will not function again for the remaining cycles of operation of the float controlled valve until a total of 12 cycles of the float controlled valve has occurred. Thus, bleeder valve 20 will function during three of the 12 cycles of the float-controlled valve.

When rotatable contact arm 40 of stepping switch 39 engages the even-numbered contacts of the stepping switch, and if the crescent conductor 44 of selector switch SW2 is moved so that it engages all six of its contacts, solenoid 48 of stepping switch 49 will be energized through its conductors 50 and 51 on alternate positions of rotatable conductor arm 40 of stepping switch 30. This causes stepping switch 49 to move its rotatable conductor arm 52 on alternate cycles of float controlled valve 14. Of course, if the crescent conductor 44 of selector switch SW2 is in engagement with less than all of its contacts, the frequency of operation of solenoid 48 will be reduced. For instance, if crescent conductor 44 of selector switch SW2 is in engagement with five of its six contacts, solenoid 48 will be operated on the fourth, sixth, eight and 10th and 12th positions of rotatable conductor 40, but not on position numbered 2, so that solenoid 48 is operated only during five out of the 12 cycles of float-controlled valve 14.

Rotatable conductor arm 52 of stepping switch 49 is connected to terminal conductor 34 through its conductor 54, and its 12 contacts are connected to the 12 contacts of selector switch SW3. Thus, a circuit will be made to one of the contacts on selector switch SW3 for every position of rotatable conductor arm 52 of stepping switch 49. If the crescent conductor 55 of selector switch SW3 is in engagement with all of its 12 contacts, a circuit will be made to relay R2 through conductor 56 on every operation of float-controlled valve 14, and relay R2 will function to operate pump P3 during every cycle. Of course, if crescent conductor 55 of selector switch SW3 is in engagement with fewer than all of its contacts, pump P3 will be operated less frequently. For instance, if crescent conductor 55 is in engagement with the first four of its 12 contacts, pump P3 will operate when rotatable conductor arm 52 of stepping switch 49 is in engagement with its first four contacts. When the rotatable conductor arm 52 moves beyond the first four contacts, pump P3 will not be operated. Since rotatable conductor arm 52 moves only on alternate operations of float-controlled valve 14, pump P3 will then operate during the first eight cycles of float-controlled valve 14, and will be dormant during the next 16 cycles of the float controlled valve. With this arrangement, pump P3 will function to cause a surge of the chemical it injects into the water of the cooling tower, and then no more of its chemical will be injected for a prolonged time.

Pump P1 will normally be the pH control pump of the system and will function to inject sulfuric acid or a similar substance into the recirculating water. Pump P2 will be the corrosion inhibitor pump and will function to inject a chromate-base liquid into the recirculating water. Pump P3 is the algaecide pump and will function to inject an ammonium-based liquid into the recirculating water. It should be noted from FIG. 1 that bleed valve 20 is located upstream from pumps P1, P2 and P3, so that the water taken from the system is removed upstream from the location where the chemicals are injected into the system.

While pumps P1, P2 and P3 are schematically illustrated as being centrifugal pumps, it will be understood that these pumps are diaphragm pumps and function to inject accurate amounts of the chemicals into the system. Moreover, while the pumps are operating, pumps P1 and P2 function to inject approximately one-fourth the quantity of liquid into the recirculating water as pump P3, and all the pumps can be adjusted to control the quantity of liquid being pumped by controlling the amplitude of diaphragm movement and the timing of the pumping by adjustment of the variable control system 33.

Generally, Pump P3 will be set for less frequent operation than pumps P1 and P2, and since pump P3 functions to flow approximately four times the volume of liquid as pumps P1 and P2, the water treating means functions to inject a massive dose of algaecide at spaced time intervals. This arrangement is beneficial to the system in that algae occasionally becomes immune to an algaecide if it is in continuous contact with a constant dose of the algaecide. The massive infrequent dosage of algaecide tends to completely overcome any algae in the flow system on an infrequent basis, which is all that is necessary to control the algae under normal circumstances. Of course, switches SW2 and SW3 can be adjusted as may be suitable for the particular geographic and atmospheric conditions to increase or decrease the frequency of operation of Pump P3 as may be desired. In a similar manner, the frequency of operation of bleed valve 20 can be adjusted by changing the setting of switch SW1, as previously described.

Since the chemical compositions are added to the flow system as the water enters the upper end of the cooling tower, the surfaces of the cooling tower will be contacted with the chemical compositions and the chemicals will be sprayed with generally even distribution onto the top surface of the water in the reservoir. This keeps any blind spots from occurring in the system where the chemicals might not reach an area of the reservoir.

While this invention has been described in detail with particular reference to preferred embodiments thereof, it will be understood that variations and modifications can be effected within the spirit and scope of the invention as described hereinbefore and as defined in the appended claims.

I claim:

1. A flow system comprising a reservoir for water or the like, a heat exchange unit, spray means for spraying water to said reservoir, recirculating flow means for flowing recirculating water from said reservoir through said heat exchange unit and to said spray means, water makeup means responsive to the level of water in said reservoir for intermittently adding additional water to said reservoir, and water treating means responsive to the flow of water from said water makeup means to said reservoir and to the flow of recirculating water for treating the water flowing from said reservoir to said spray means, said water treating means including drain means for draining water from said flow system during less than all of the cycles of operation of said water makeup means.

2. The flow system of claim 1 and wherein said drain means comprises means for draining water from the water in said flow means downstream from said heat exchange unit and upstream from said spray means, and wherein said water treating means further comprises chemical additive means for adding a chemical composition to the water in said flow means downstream from the point in said flow means where the water is drained and upstream from said spray means.

3. The flow system of claim 1 and wherein said water treating means comprises chemical additive means selectively responsive to at least some of the sequential cycles of intermittent addition of make up water by said water make up means for adding a chemical composition to the water of the flow system.

4. The flow system of claim 1 and wherein said drain means is selectively responsive to one-half or fewer of the cycles of intermittent addition of makeup water by said water makeup means for draining water from the water of the flow system, said water treating means further comprising first chemical additive means responsive to each of the cycles of intermittent addition of make up water by said water makeup means during the operation of said flow means for adding a chemical composition to the water of the flow system, and second chemical additive means selectively responsive to various cycles of the intermittent addition of makeup water by said water makeup means for adding a chemical composition to the water of the flow system.

5. A flow system comprising a reservoir for containing water or the like, a heat exchange unit, spray means arranged to spray water through a cooling tower to said reservoir, flow means for flowing the water from said reservoir through said heat exchange unit to said spray means, water makeup means responsive to the level of water in the said reservoir for flowing water or the like to said reservoir when the level of water in said reservoir is low and until the level of water in said reservoir reaches a predetermined level, water drain means selectively responsive to one-half or fewer of the cycles of water flow through said water makeup means during the operation of said flow means for draining water flowing from said heat exchange unit to said spray means only during the flow of water by said water makeup means, first chemical additive means responsive to each of the cycles of water flow through said water makeup means during the operation of said flow means for adding a chemical composition to the water flowing from said heat exchange unit to said spray means, and second chemical additive means selectively responsive to all or fewer of the cycles of water flow through said water makeup means during the operation of said flow means for adding a chemical composition to the water flowing from said heat exchange unit to said spray means.

6. In a flow system comprising a cooling tower, a reservoir below the cooling tower, a heat exchange unit, and flow means connected between the reservoir, heat exchanger and cooling tower for recirculating water from the reservoir through the heat exchanger and to the cooling tower, and a water makeup means responsive to the level of water in said reservoir to flow makeup water to the reservoir, the improvement therein comprising water treating means operative only during the flow of water through the water makeup means for adding chemical compositions to the water being recirculated in said flow system during each cycle of operation of said water makeup means and for draining a portion of the recirculating water during less than each cycle of operation of said water makeup means.

7. The invention of claim 6 and wherein said water treating means comprises at least one pump means operative only during the flow of water through the water makeup means and during the flow of water through the flow means to add a chemical composition to the water flowing through the flow means.

8. The invention of claim 6 and wherein said water treatment means comprises at least two pump means selectively operative during various cycles of operation of the water makeup means to add chemical compositions to the water of the flow system.

9. A flow system comprising a reservoir for water or the like, a heat exchanger, spray means for spraying the water to said reservoir, recirculating flow means for flowing water from said reservoir through said heat exchanger and to said spray means, water makeup means responsive to the level of water in said reservoir for intermittently adding water to said system, water drain means responsive to selected cycles of said water makeup means for draining water from said system only during the flow of makeup water to said system, first chemical additive means for adding a first chemical composition to said flow system upon each cycle of said water makeup means and a second chemical additive means for adding a second chemical composition to said system at selected ones of the cycles of said water makeup means.

* * * * *